(12) United States Patent
Helder et al.

(10) Patent No.: US 6,912,709 B2
(45) Date of Patent: Jun. 28, 2005

(54) MECHANISM TO AVOID EXPLICIT PROLOGS IN SOFTWARE PIPELINED DO-WHILE LOOPS

(75) Inventors: David A Helder, Holland, MI (US); Kalyan Muthukumar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 09/753,254

(22) Filed: Dec. 29, 2000

(65) Prior Publication Data

US 2002/0129228 A1 Sep. 12, 2002

(51) Int. Cl.⁷ .................................................. G06F 9/44
(52) U.S. Cl. ...................... 717/161; 717/150; 712/241; 712/239; 714/241
(58) Field of Search ........................................ 717/160

(56) References Cited

U.S. PATENT DOCUMENTS

| | | | | |
|---|---|---|---|---|
| 5,930,510 A | * | 7/1999 | Beylin et al. | 717/161 |
| 6,026,240 A | * | 2/2000 | Subramanian | 717/161 |
| 6,571,385 B1 | * | 5/2003 | Muthukumar et al. | 717/150 |
| 6,820,250 B2 | * | 11/2004 | Muthukumar et al. | 717/116 |

OTHER PUBLICATIONS

Advanced Compiler Design And Implementation, Steven S. Muchnick, Aug. 19, 1997, pp. 267, 548–551.*
Parallelization of Loops with Exits on Pipelined Architectures. P. Trimumalai et al, IEEE, 1990.*
"Code Generation Schema for Modulo Scheduled Loops", B. Ramakrishn Rau et al, ACM, 1992.*
"Unrolling–Based Optimizations for Modulo–Scheduling". Daniel M. Lavery et al, ACM, 1995.*
"Software Pipelining Loops with Conditional Branches", Mark G. Stoodley et al, ACM, 1996.*
"Register Allocation for Software Pipelined Loops", B.R. Rau et al, ACM, 1992.*
Non–unimodular Transformations of Nested Loops, J. Ramanujam, IEEE, 1992.*

* cited by examiner

*Primary Examiner*—Todd Ingberg
(74) *Attorney, Agent, or Firm*—Shireen I. Bacon

(57) ABSTRACT

The present invention provides a mechanism that facilitates speculative execution of instructions within software-pipelined loops. In accordance with one embodiment of the invention, a software-pipelined loop is initialized with a speculative instruction deactivated. At least one initiation interval of the software-pipelined loop is executed, and the speculative instruction is activated. Subsequent initiation intervals of the software-pipelined loop are then executed.

26 Claims, 9 Drawing Sheets

US 6,912,709 B2

MECHANISM TO AVOID EXPLICIT PROLOGS IN SOFTWARE PIPELINED DO-WHILE LOOPS

BACKGROUND OF THE INVENTION

1. Technical Field

The present invention relates to mechanisms for optimizing computer code, and in particular, to mechanisms for improving the performance of software-pipelined loops.

2. Background Art

Software pipelining is a method for scheduling non-dependent instructions from different logical iterations of a program loop to execute concurrently. Overlapping instructions from different logical iterations of the loop increases the amount of instruction level parallelism (ILP) in the program code. Code having high levels of ILP uses the execution resources available on modern, superscalar processors more effectively.

A loop is software-pipelined by organizing the instructions of the loop body into stages of one or more instructions each. These stages form a software-pipeline having a pipeline depth equal to the number of stages (the "stage count" or "SC") of the loop body. The instructions for a given loop iteration enter the software-pipeline stage by stage, on successive initiation intervals (II), and new loop iterations begin on successive initiation intervals until all iterations of the loop have been started. Each loop iteration is thus processed in stages through the software-pipeline in much the same way that an instruction is processed in stages through a processor pipeline. When the software-pipeline is full, stages from SC sequential loop iterations are in process concurrently, and one loop iteration completes every initiation interval.

Various methods for implementing software-pipelined loops are discussed, for example, in B. R. Rau, M. S. Schlansker, P. P. Tirumalai, *Code Generation Schema for Modulo Scheduled Loops* IEEE MICRO Conference 1992 (Portland, Oreg.) and in, B. R. Rau, M. Lee, P. P. Tirumalai, M. S. Schlansker, *Register Allocation for Software-pipelined Loops,* Proceedings of the SIGPLAN '92 Conference on Programming Language Design and Implementation, (San Francisco, 1992).

The initiation interval (II) represents the number of processor clock cycles ("cycles") between the start of successive iterations in a software-pipelined loop. The minimum II for a loop is the larger of a resource II (RSII) and a recurrence II (RCII) for the loop. The RSII is determined by the availability of execution units for the different instructions of the loop. For example, a loop that includes three integer instructions has a RSII of at least two cycles on a processor that provides only two integer execution units. The RCII reflects cross-iteration or loop-carried dependencies among the instructions of the loop and their execution latencies. If the three integer instructions of the above-example have one cycle latencies and depend on each other as follows, inst1→inst2→inst3→inst1, the RCII is at least three cycles.

A software-pipelined loop has its maximum ILP when its RCII is less than or equal to its RSII. Various optimization techniques may be applied to the loop to reduce its RCII. The efficacy of these optimizations may be greatly enhanced by allowing instructions to be executed speculatively. An instruction is executed speculatively ("speculated") if it is executed before the processor determines that the instruction needs to be executed. In software-pipelined loops, instructions from multiple loop iterations execute in parallel. Instructions from later iterations that are executed concurrently with instructions from a current iteration may be speculated. That is, their execution may be unnecessary if the loop terminates with the current iteration.

One problem created by allowing speculative execution within a software-pipelined "while" loop is that a speculatively executed instruction may modify ("clobber") values that are provided as input to the loop ("live-in values") before the input values are used. This happens in "while" loops because the loop condition is determined by instructions within the loop body, and cannot be used to activate (or gate) a speculatively executed instruction in the prolog phase. If the speculative instruction is in the first stage of the software pipeline, no problem arises because the instruction executes as soon as the loop begins. However, if the speculatively executed instruction is scheduled in a later stage of the software pipeline, the loop control mechanism provides no simple way to gate execution of the speculative instruction at the appropriate time. Data corruption can result if the speculated instruction executes prematurely and over-writes a live-in value before the value is used.

One way to implement speculative execution within a software pipeline without clobbering a live-in value is through an explicit prolog. In an explicit prolog, some or all of the instructions that would otherwise execute during the prolog phase of the software-pipelined loop are scheduled for execution before the loop begins. The loop is then initiated at a later stage of the prolog phase or with the software pipeline full, i.e. at the start of the kernel phase. This eliminates the risk of clobbering live-in values with speculatively executed instructions, but it also expands the size of a code segment because instructions of the prolog are duplicated (they appear in the loop body and one or more times in the explicit prolog). The resulting code expansion can be significant, particularly if the loop body includes a large number of instructions and multiple prolog stages need to be explicitly coded.

The present invention addresses these and other problems associated with software pipelining of loops.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for supporting the speculative execution of an instruction within a loop. For one embodiment of the present invention, a predicate is initialized to false outside a software-pipelined loop ("sticky predicate"), and an instruction in the loop is scheduled for speculative execution, guarded by the predicate. Another instruction in the loop sets the predicate to true once a live-in value that may be written directly or indirectly by the speculated instruction is consumed.

Embodiments of the present invention are illustrated using instructions from the IA64™ Instruction Set Architecture (ISA) of Intel Corporation, but these embodiments may be implemented in other ISAs that support predication and software pipelining. The IA64 ISA is described in detail in the Intel® IA64 Architecture Software Developer's Guide, Volumes 1–4, which is published by Intel® Corporation of Santa Clara, Calif.

Figure 1A:
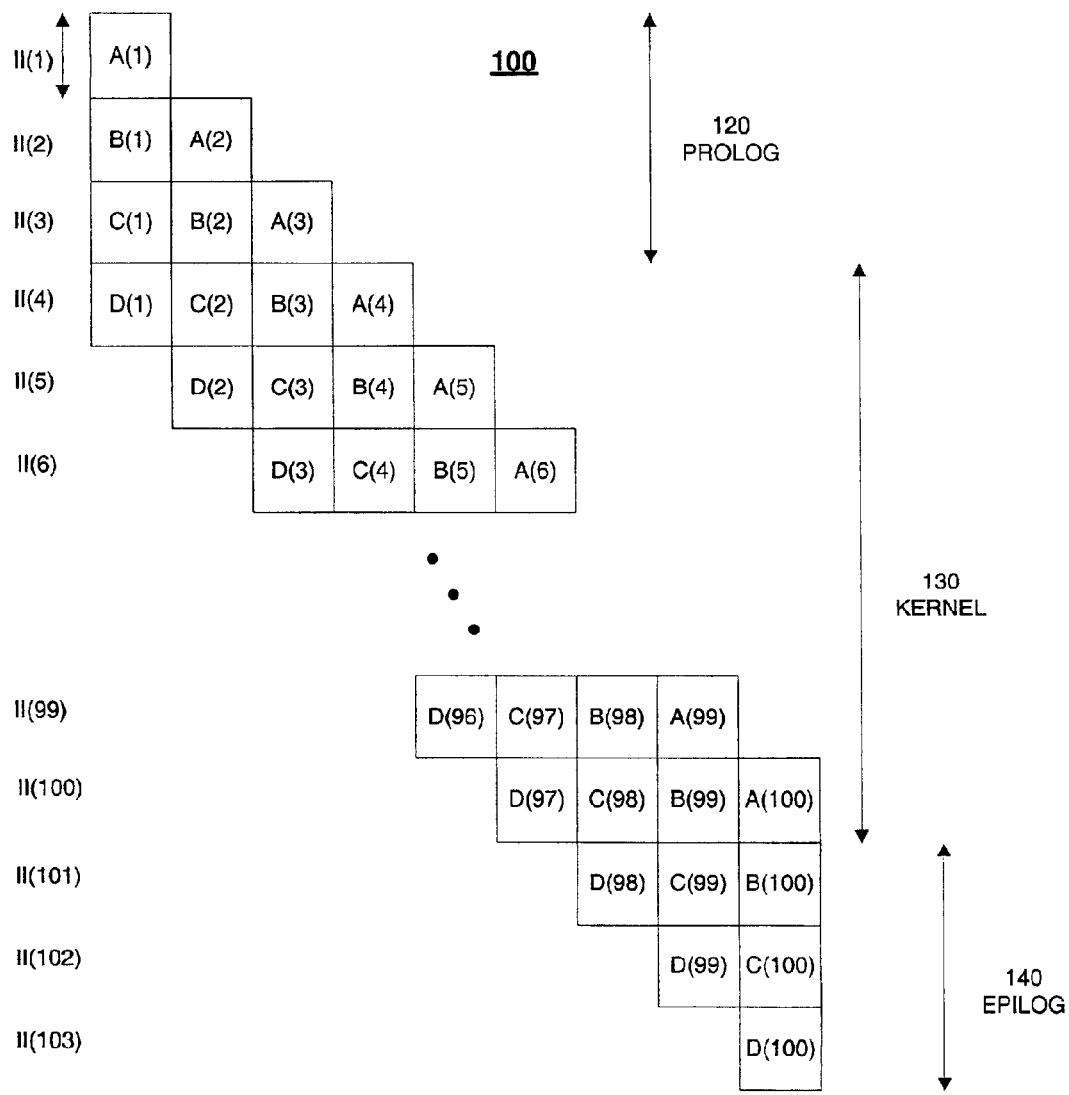
FIG. 1A is a block diagram representing a software-pipelined loop.

FIG. 1A is a schematic representation of an idealized software-pipelined loop (SWL) 100 having pipeline stages A, B, C, and D(SC=4). During a first initiation interval (II), the instructions of stage A for a first iteration of SWL 100 execute. During a second II, instructions of stage A for a second iteration of SWL 100 execute in parallel with the instructions of stage B for the first iteration of SWL 100. During a third II, instructions of stage A for the third iteration of SWL 100, instructions of stage B for the second iteration of SWL 100 and instructions of stage C for the first iteration of SWL 100 execute in parallel. On subsequent iterations, until an end of loop condition is detected, instructions of stages A, B, C and D for successive iterations of SWL 100 execute in parallel.

Figure 1B:
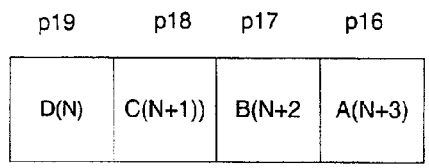
FIG. 1B represents the software-pipelined loop of FIG. 1A, as implemented using stage predicates.

FIG. 1B represents an embodiment of a counted SWL 100 that has been implemented using predicates. For a counted SWL 100, the instructions of stages A, B, C, and D are activated (during the prolog phase) and deactivated (during the epilog phase) through associated stage predicates, p16, p17, p18 and p19, respectively. This is a relatively straightforward process for counted loops, because the loop condition is known at the start of each iteration. For example, the IA64 ISA provides a loop count register (LC) to track the number of iterations that remain to be executed. New iterations are initiated until LC indicates the last has been reached, i.e. the loop condition is no longer true, at which point stage predicates are turned off sequentially to empty the software pipeline.

For "while" loops, the loop condition is determined by instructions within the loop, and a stage predicate is set true or false, according to the condition that is determined. The value of the stage predicate may depend on instructions executed over multiple stages of the software pipeline. Consequently, multiple initiation intervals may pass before it is known whether the instructions for a given loop iteration should be executed. Since the stage predicate is set relatively late in a loop iteration, some of the stages cannot be gated by the stage predicate. Un-gated instructions that execute prior to determination of the stage predicate are, consequently, speculative.

Figure 2:
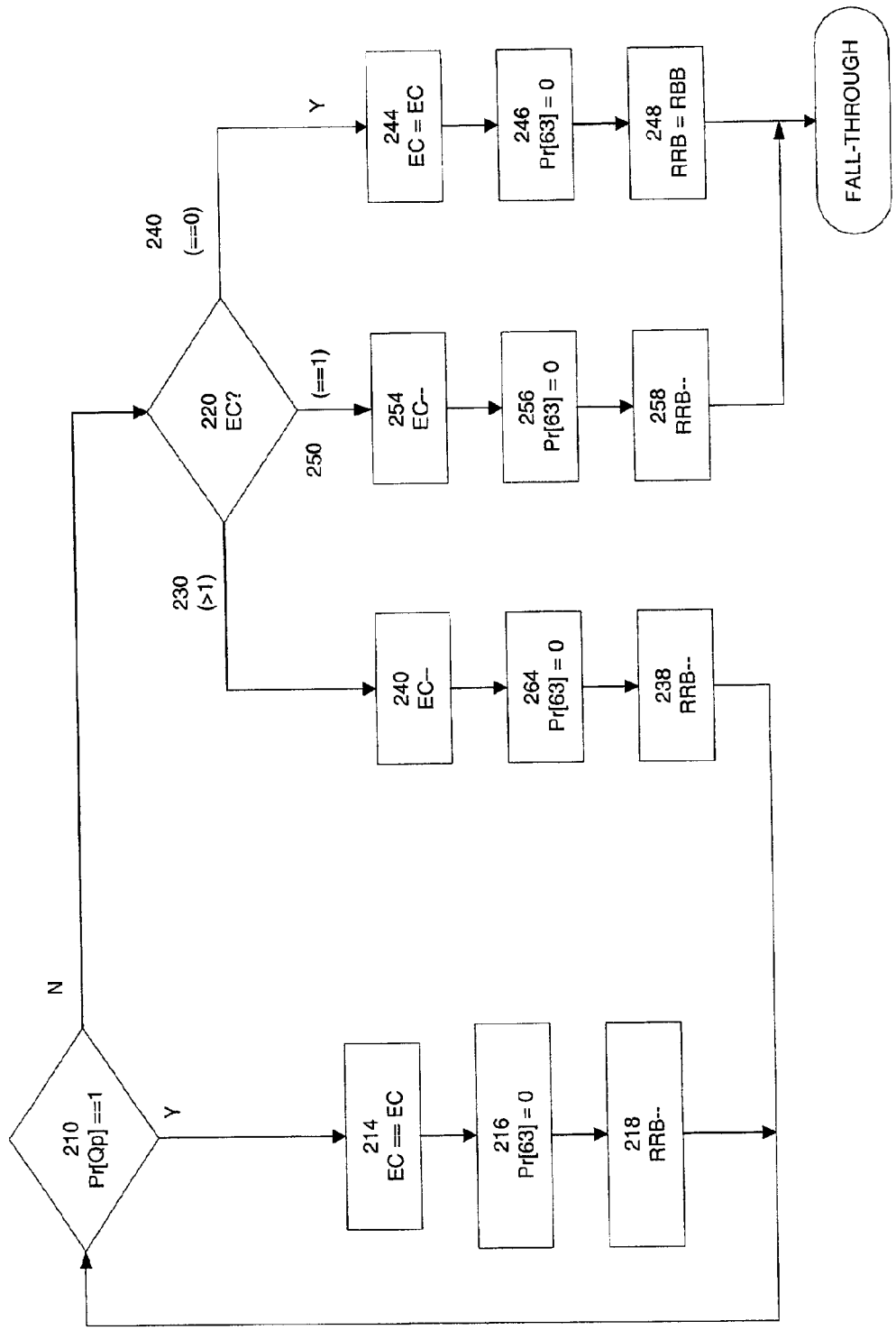
FIG. 2 is a flowchart representing one mechanism for implementing the branch operations associated with a software-pipelined "while" loop.

FIG. 2 is a flow chart representing the operation of one embodiment of a "while" loop branch instruction that is suitable for implementing the present invention. The operations represented in the figure correspond to those implemented by a wtop-type branch (br.wtop) in the IA-64 instruction set architecture (ISA) of Intel® Corporation. Other ISAs that support software pipelining and predication may provide comparable functionality through various combinations of instructions, hardware, and compiler support, and may be used to implement embodiments of the present invention.

For the disclosed "while" branch, values of an epilog counter (EC) and a qualifying predicate, PR[qp], determine whether the instructions of the loop body (or a subset of these instructions) are repeated. Here, PR[qp] represents the branch or loop condition, and EC indicates the number of stages in a software-pipelined loop. Depending on how the software pipeline is programmed, EC may be initialized to different values relative to the number of pipeline stages. The "while" loop continues if PR[qp] is true 210 or if EC>1 (even if PR[qp] is false). The stages of the loop body (or a subset of these stages) are repeated until PR[qp] is zero and EC is one.

The disclosed embodiment of "while" loop 200 employs register rotation to manage the registers for the different loop iterations that are active (in process) at the same time. For example, PR[qp] is zero (false) and EC>1 for the prolog phases of certain software-pipelined loops, and branch 200 updates 230 various loop-tracking parameters (EC, RRB, PR[63]) before commencing a next II of the loop. For the disclosed branch operation, EC is decremented 234 (EC--), a rotating predicate register, PR[63], is written 236, and a base value for the rotating registers (RRB) is decremented 238.

A register rename unit may use RRB to effect a rotation of all rotating registers supported by the ISA. For example, the values in rotating predicate registers PR[16], PR[17] . . . PR[62], PR[63] are rotated into PR[17], PR[18] . . . PR[63], PR[16], respectively. One of the low-order rotating predicate registers, e.g. PR[16], PR[17], PR[18] . . . , serves as the stage predicate, which gates execution of non-speculative instructions in a "while" loop. Register rotation of the zero in PR[63] sets the stage predicate to zero, which ensures that the loop only repeats if the loop condition resets the stage predicate to one on the next loop iteration.

Similar management operations are implemented for other combinations of PR[qp] and EC. For example, if PR[qp] is non-zero (true) 210, the value of EC is preserved 214, PR[63] is written 216, and RRB is decremented 218. If PR[qp] is zero and EC is one 250, the last stage of the software-pipelined loop is executing. The loop parameters are adjusted 254, 256, 258 and control passes to a fall through instruction.

In the following discussion, embodiments of the present invention are discussed with reference to the "while" loop mechanism of FIG. 2. However, the present invention is not limited to this mechanism and may be implemented using other loop management mechanisms.

Code sequence (I) illustrates a "while" loop having three stages (A, B and C), the second of which includes a compare instruction that is speculated. That is, when the loop portion of code sequence (I) is software-pipelined (FIG. 3A), the compare instruction (4) for a subsequent loop iteration executes before the control compare instruction (instruction (5)) is executed for the current loop iteration. The control compare instruction is the compare instruction that determines whether the loop condition is true or false. In this example, p17 is the loop or stage predicate. Mechanisms for enabling compare speculation in this manner are discussed, for example, in U.S. patent application Ser. No. 09/608,504, entitled "Compare Speculation in Software-Pipelined Loops" and filed on Jun. 30, 2000.

```
         (1)           mov    pr.rot = 0x10000    // initialize predicates
         (2)           mov    EC     = 2          // initialize EC
   Loop:
         (3)           ...                        // stage A
(I)      (4)           cmp.ne p20    = r39, r0    // stage B
         (5)   (p21)   cmp.le p17    = r35, r11   // stage C
         ...
         (6)   (p17)   br.wtop Loop.
```

Compare speculation provides greater scheduling flexibility for software-pipelined loops, but it can also create problems if the speculated compare instruction executes prematurely. For example, instruction (4) over-writes or "clobbers" a live-in value of the stage predicate that is provided to the loop of code sequence (I). This is illustrated with reference to FIG. 3A.

Figure 3A:
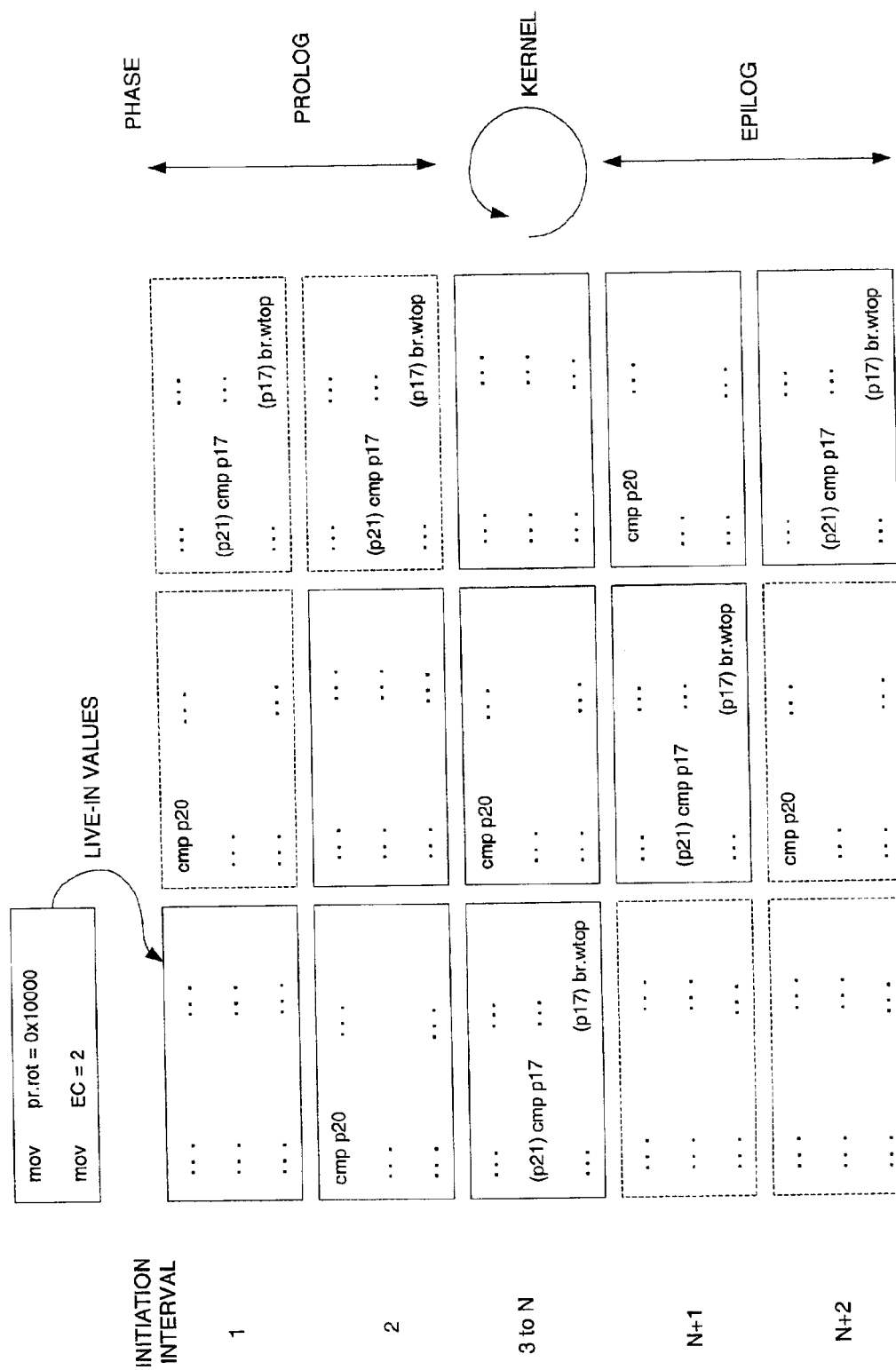
FIGS. 3A and 3B are schematic representations of various aspects of a software-pipelined "while" loop in which a speculative instruction clobbers a live-in value.

FIG. 3A illustrates a software-pipeline generated from code sequence (1). Initialization instructions are shown above SWL 300, loop iterations are shown to the left of SWL 300 and loop phases (prolog, epilog and kernel) are shown to the right of SWL 300. Shifts in the stages horizontal positions reflect the rotation of predicate registers. Stages that are not intended to execute during the prolog and epilog phases are indicated by dashed boxes. However, because the stage predicate is not actually calculated until the third II, the stages cannot be activated and deactivated using the branch apparatus alone.

Prior to initiating SWL 300, instruction (1) sets the value in rotating predicate register PR[16] to one and the values in remaining rotating predicate registers (PR[17]–pr[63]) to zero, i.e. pr.rot=0×10000. Instruction (2) sets the value in EC to 2. For this embodiment of LOOP, PR[17] is the qualifying predicate, the value of which determines whether the loop condition is true. During steady state operation of SWL 300 (kernel phase), the loop condition is determined by instruction (5), which may depend on a series of instructions in Stages A, B, and C.

During the first iteration (II=1), stage A is executed with PR[17]=zero and EC>0. According to FIG. 2, br.wtop proceeds down path 230, setting PR[63] zero, decrementing EC to 1, and rotating the values in all rotating registers (including the predicate registers). For the second II, PR[17] is one due to rotation of the initialized value in PR[16] to Pr[17]. That is pr[17] is written, indirectly, from the live-in value specified by instruction (1). If instruction (4) in stage B (indicated as cmp p20) was not executed in the first II, br.wtop would proceed down path 212 in the second II. Under this scenario, Stage B executes during the second II, setting p20 true, and in the third II, instruction (5) is gated on when the value of p20 is rotated into p21. Thereafter, instruction (5) determines whether the loop condition is true according to the value of p17.

Because instruction (4) is speculated, it is not gated off in the first II, and it executes, providing a value for p20. In the disclosed example, p20 is true if r39 is non-zero (since r0 is hardwired to zero), and instruction (5), cmp.eq p17, executes prematurely in the second II. As a result, the live-in value of PR[17] provided by register rotation, may be "clobbered" by the value provided by instruction (5).

As noted above, one mechanism for supporting speculated instructions without clobbering live-in values, is to execute the prolog or a portion of the prolog ahead of the loop. This allows the software-pipelined loop to begin at or near the kernel phase. An obvious downside of this strategy is that it expands code. For example, if a speculated instruction is scheduled in the third stage of a software pipeline having four stages, it may be necessary to explicitly code the instructions representing the first two IIs of the pipeline ahead of the loop.

Figure 3B:
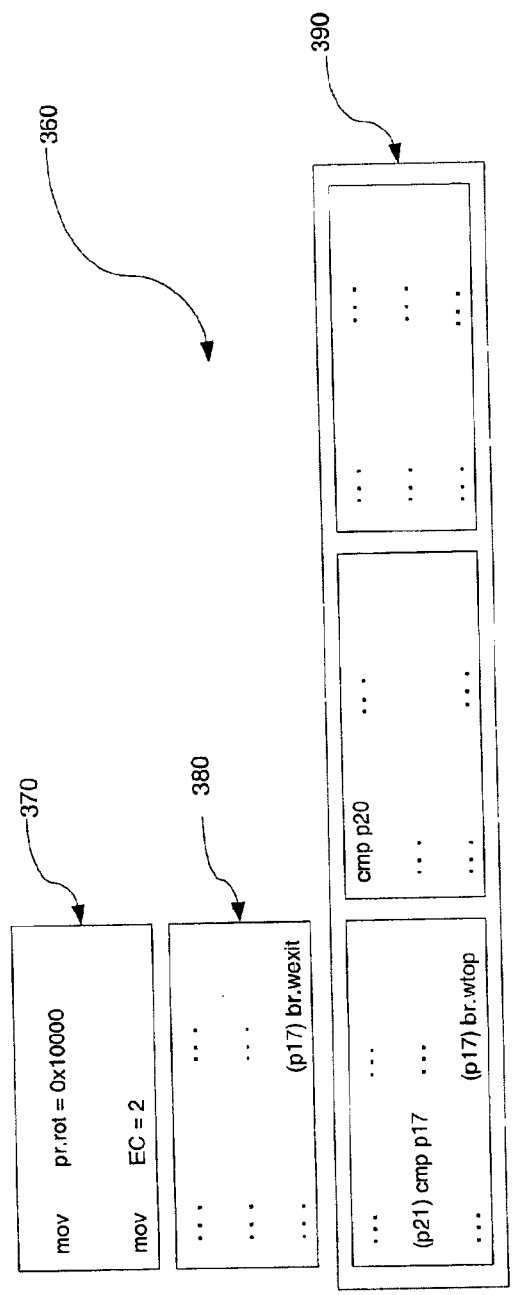

FIG. 3B indicates a code block 360 for code sequence (I) in which an explicit prolog is used to avoid clobbering live-in values. Code block 360 includes initialization code 370, explicit prolog 380 and kernel code 390. It is evident that inclusion of explicit prolog 380 increases the size of code block 360. For loops with large IIs or loops in which the speculative instruction occurs in later pipeline stages, the increased code size can be significant.

For one embodiment of the present invention, an instruction may be scheduled for speculative execution in a stage other than the first stage of a software pipeline without recourse to explicit prologs. This may be accomplished by guarding the speculated instruction with a "sticky predicate". The sticky predicate is a predicate that is initialized to zero (false) before entering the software-pipelined loop. It is set to one (true) once the software-pipeline reaches a point at which the speculated instruction will no longer clobber a live-in value to the loop. For example, if the speculated instruction writes a value that is also provided as a live-in value to the loop, the sticky predicate may be activated once the live-in value has been consumed.

Code sequence (II) is a version of code sequence (I) that has been modified in accordance with the present invention. Stages in which the instructions are scheduled when the loop is software-pipelined are indicated to the right.

|      |       | (1)  |       | mov    | pr.rot | = 0x10000  | // initialize predicates      |
|------|-------|------|-------|--------|--------|------------|-------------------------------|
|      |       | (2)  |       | mov    | EC     | = 2        | // initialize EC              |
|      |       | (7)  |       | cmp.ne | p12    | = r0, r0   | // initialize p12 'false'     |
|      | Loop: |      |       |        |        |            |                               |
|      |       | (3)  |       | ...    |        |            | // stage A                    |
|      |       | (8)  | (p17) | cmp.eq | p12    | = r0, r0   | // stage B                    |
| (II) |       | (4)  | (p12) | cmp.ne | p20    | = r39, r0  | // stage B                    |
|      |       | (5)  | (p21) | cmp.le | p17    | = r35, r11 | // stage C                    |
| P7527 |      |      |       |        |        |            |                               |
|      |       | (6)  | (p17) | br.wtop | Loop.  |            |                               |

Here, p12 is the sticky predicate. It is initialized to zero by instruction (7) before the loop begins. The value of p12 remains zero during the first II, since instruction (8) is guarded by p17, which was initialized to zero. The value of p16 (one) is a live-in value that is set by instruction (1) for the first II and rotated into p17 for the second II. Instruction (8) is thus activated on the second II, setting p12 to one. This in turn triggers the execution of instruction (4) which executes at the appropriate stage (stage B) and sets the value of p20. The value of p20 is rotated into p21 on the third II of the loop. This activates instruction (5) which sets p17, the qualifying predicate for the loop.

Figure 4B:
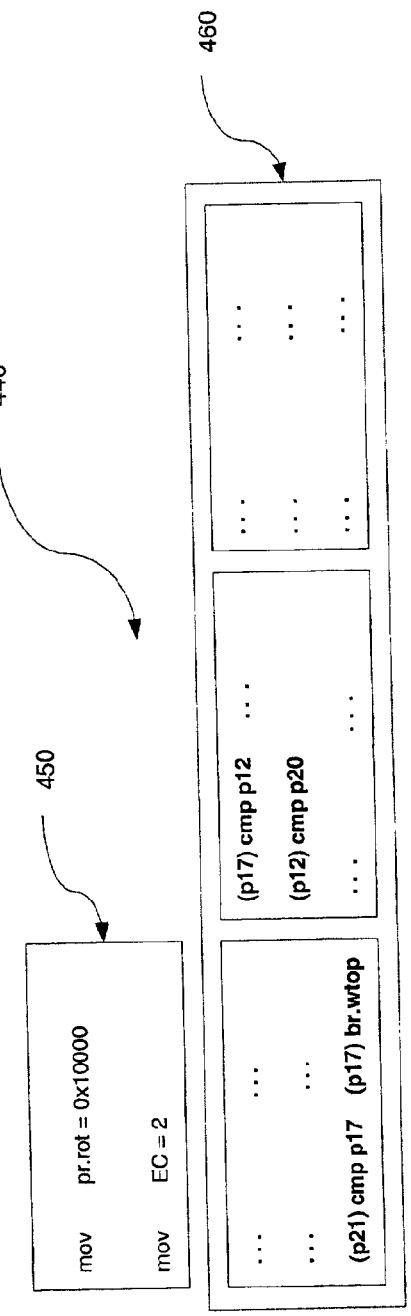
FIGS. 4A and 4B are schematic representations of aspects of the software-pipelined "while" loop of FIGS. 3A–3B that has been modified in accordance with the present invention.
Figure 4A:
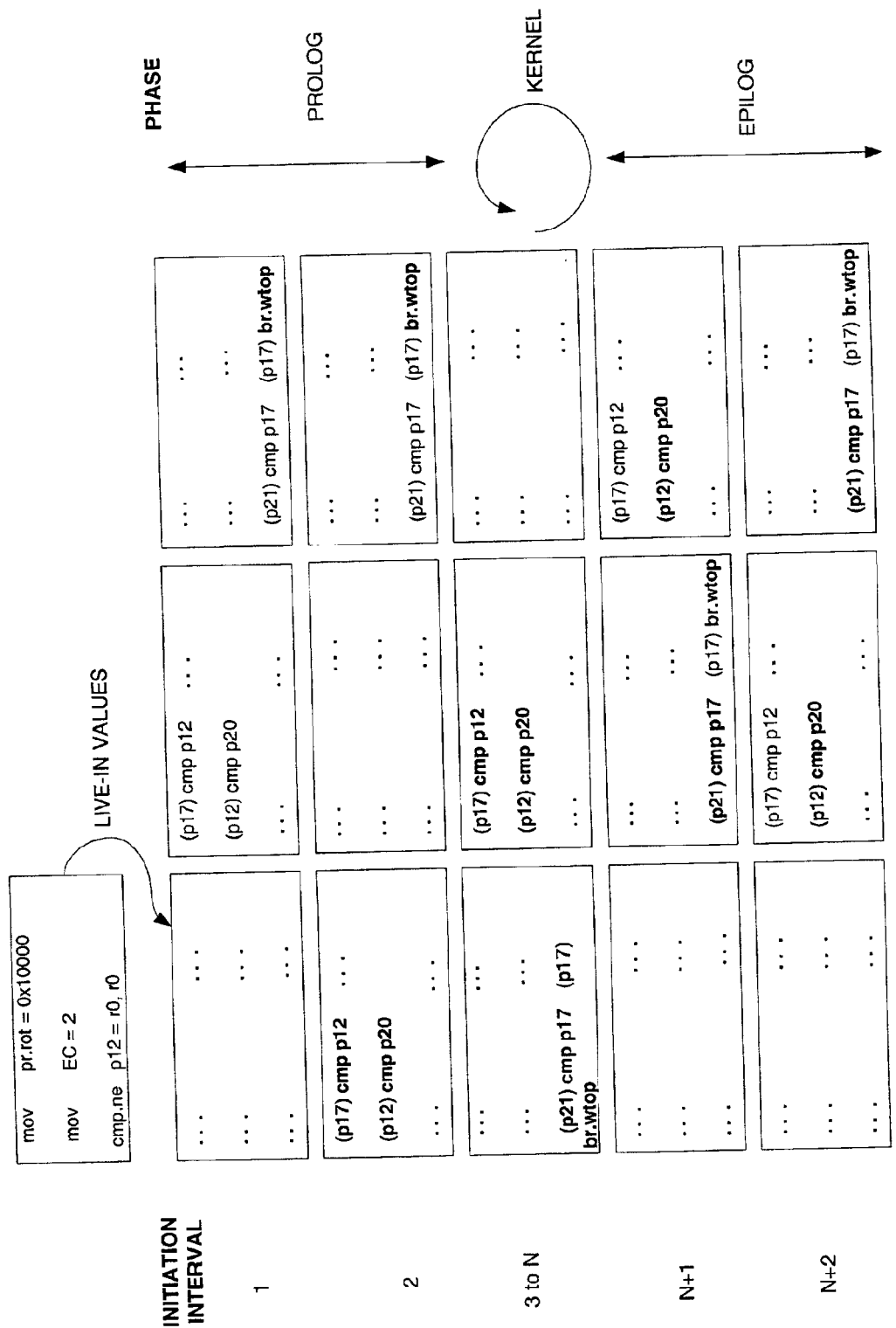

FIG. 4A represents a software pipeline 400 generated by software pipelining code sequence (II). Bold face type is used to indicate that an instruction is activated for a given II. Because loop operations occur during the prolog and epilog phases, br.wtop is always activated once the loop starts, even when the qualifying predicate, p17, is false. While br.wtop is always shown as activated, p17 is bolded or not depending on whether it is true or false, respectively.

Prior to executing SWL 400, rotating predicate registers and EC are initialized by instructions (1) and (2). In addition, instruction (7) initializes sticky predicate, p12, to zero (false). During the first II, the instructions of stage A execute. With p17=0 and EC=2, br.wtop (FIG. 2) executes down path 230, decrementing EC (EC--), setting PR[63]=0, and rotating registers (RRB--). The last operation rotates the value one from p16 into p17 for the second II. Instruction (8) (cmp p12), which sets the sticky predicate, is gated off by stage predicate p17, and speculative instruction (4) (cmp p20), is gated off by sticky predicate p12. Instruction (5) in stage C is also gated off by predicate p21, which is initialized to zero. Stages A, B, and C may include other instructions that are gated on or off in accordance with the present invention.

During the second II, p17 is one, which activates instruction (8) in stage B and also sends instruction (6) down path 212 in stages A, B, and C. Instruction (8) sets p12 to one, activating instruction (4). Execution of instruction (4) sets p20 to one (true), and execution of instruction (6) rotates the one from p20 to p21 for the third II. During the third II, instruction (5) is activated, allowing the loop condition to be determined by the control compare instruction through the kernel phase of the loop. In sum, the activation of instructions, including speculative compare instruction (4), is accomplished without "clobbering" the live-in value of p17 used in the second II.

FIG. 4B represents a code block 440 generated in accordance with the present invention. Code block 440 includes initialization code 450 and kernel code 460. Initialization code includes instruction (7) to initialize the sticky predicate (p12), and kernel code 460, includes instruction (8) to set the sticky predicate once the live-in value has been consumed. These relatively minor additions eliminate the need for an explicit prolog for SWL 440 without the risk of corrupting the live-in value(s).

Code sequence (III) is a version of code sequence (I) that has been modified in accordance with another embodiment of the present invention.

|       |       | (1) |       | mov    | pr.rot | = 0x10000  | // initialize predicates      |
|-------|-------|-----|-------|--------|--------|------------|-------------------------------|
|       |       | (2) |       | mov    | EC     | = 2        | // initialize EC              |
|       |       | (7) |       | cmp.ne | p12    | = r0, r0   | // initialize p12 'false'     |
|       | Loop: |     |       |        |        |            |                               |
|       |       | (3) |       |        |        |            |                               |
| (III) |       | (4) | (p12) | cmp.ne | p20    | = r39, r0  | // stage B                    |
|       |       | (8) | (p16) | cmp.eq | p12    | = r0, r0   | // Stage A                    |
|       |       | (5) | (p21) | cmp.le | p17    | = r35, r11 | // stage C (CCMP)             |
| P7527 |       |     |       |        |        |            |                               |
|       |       | (6) | (p17) | br.wtop | Loop.  |            |                               |

For this version, the instruction that sets the sticky predicate (p12) follows the speculatively executed instruction and is guarded by the first rotating predicate register (p16). Because p16 is initialized to one by instruction (1) ahead of the loop, instruction (8) executes in the first II. Instruction (4) executes in the second II and instruction (5) executes in the third II.

Figure 5:
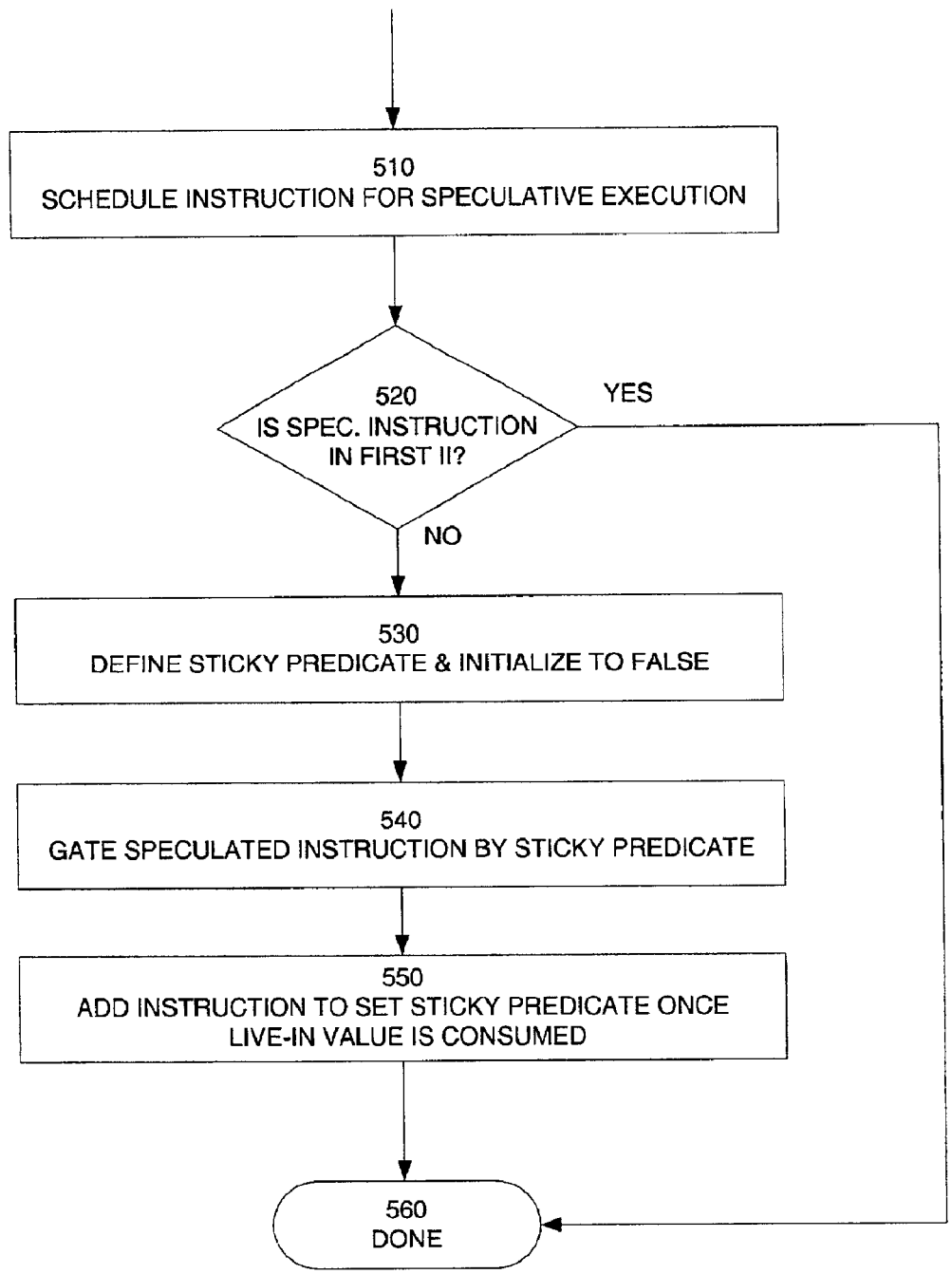
FIG. 5 is a flowchart summarizing one embodiment of a method in accordance with the present invention for software pipelining "while" loops that include speculative instructions.

FIG. 5 is a flowchart representing one embodiment of a method 500 for supporting speculative execution in accordance with the present invention. Instructions of a loop to be software-pipelined are scheduled 510, including any instructions that may be executed speculatively. For one embodiment, this may be accomplished by removing a loop carried edge from the control compare of the loop to an instruction that may be speculated. For example, if a compare instruction is scheduled ahead of the control compare instruction for a previous iteration of the loop, the compare instruction will be speculated. In code sequence (II), instruction (4) is scheduled for execution ahead of the control compare (instruction (5)) of the previous iteration and is therefore speculated.

The software-pipelined loop is checked to determine 520 whether a speculatively executed instruction occurs in a stage other than the first stage (e.g. stage A) of the software pipeline. If the speculated instruction is only in the first stage 520, method 500 is done. If the speculative instruction is scheduled in a stage other than the first stage, a predicate is defined and initialized 530 to false, and the speculative instruction is gated 540 by the sticky predicate. In the above example, instruction (4) is scheduled for execution in stage B. It is guarded with a sticky predicate, p12, and instruction (7) is scheduled ahead of the loop to initialize p12 to false.

Another instruction is added 550 to the loop body to set the sticky predicate to true after the live-in value has been used. This instruction may be activated by gating it with a stage predicate that is set with a suitable delay. In the example provided by code sequence (II), instruction (8) is activated by p17, which is set to one in the second II through register rotation. Method 500 may be repeated for each speculative instruction that executes in a stage of the software pipeline other than the first stage.

Code sequences (II) and (III) illustrate embodiments of a loop in which a compare instruction is speculated. The present invention may be applied to loops that speculate on instructions other than compare instructions.

Code sequence (IV) illustrates a "while" loop having three stages (A, B, C). Stage B includes a load instruction (ld4) that returns a value to a register (r35), and stage B includes an add instruction that consumes the value returned to the register.

```
             (1)         mov   r35 = init_val
             (2)         mov   pr.rot = 0x10000
       Loop:
(IV)         (3)         . . .
             (4)         ld4 r35 = [r28]          // stage B
             (5)         . . .
             (6)         add r37 = r35, r10       // stage A
             (7)  (p17)  br.wtop  Loop
```

The value in r35 used by instruction (6) in a given iteration of the loop is written by instruction (4) that is executed in a prior iteration of the loop. The value used by instruction (6) in the first iteration of the loop is provided as a live-in value to the loop. Both the load and add instructions are speculatively executed, as can be seen from FIG. 6. PR[qp] is not determined until after these instructions are executed. Since the load instruction is not gated by a qualifying predicate, it executes prematurely in stage A, clobbering the live-in value of r35, which is supposed to be used by the add.

Using the method outlined in FIG. 5, code sequence (V) is generated from code sequence (IV) to support software pipelining of the loop without need for an explicit prolog.

```
             (1)         mov     r35 = init_val
             (2)         mov     pr.rot = 0x10000
             (8)         cmp.ne  p12 = r0, r0
       Loop:
(V)          (3)         . . .
             (9)  (p17)  cmp.eq  p12 = r0, r0      // stage B
             (4)  (p12)  ld4 r35 = [r28]           // stage B
             (5)         . . .
             (6)         add r37 = r35, r10        // stage A
             (7)  (p17)  br.wtop  Loop
```

For code sequence (V), ld4 is identified as the speculatively executed instruction. Instruction (8) is added to define a sticky predicate, p12, and instruction (4), ld4, is guarded by the sticky predicate. In addition, an instruction (9) is added to stage B to turn set p12 true following execution of the first initiation interval. Activation of instruction (9), which sets the sticky predicate, is controlled through stage predicate p17.

Figure 6:
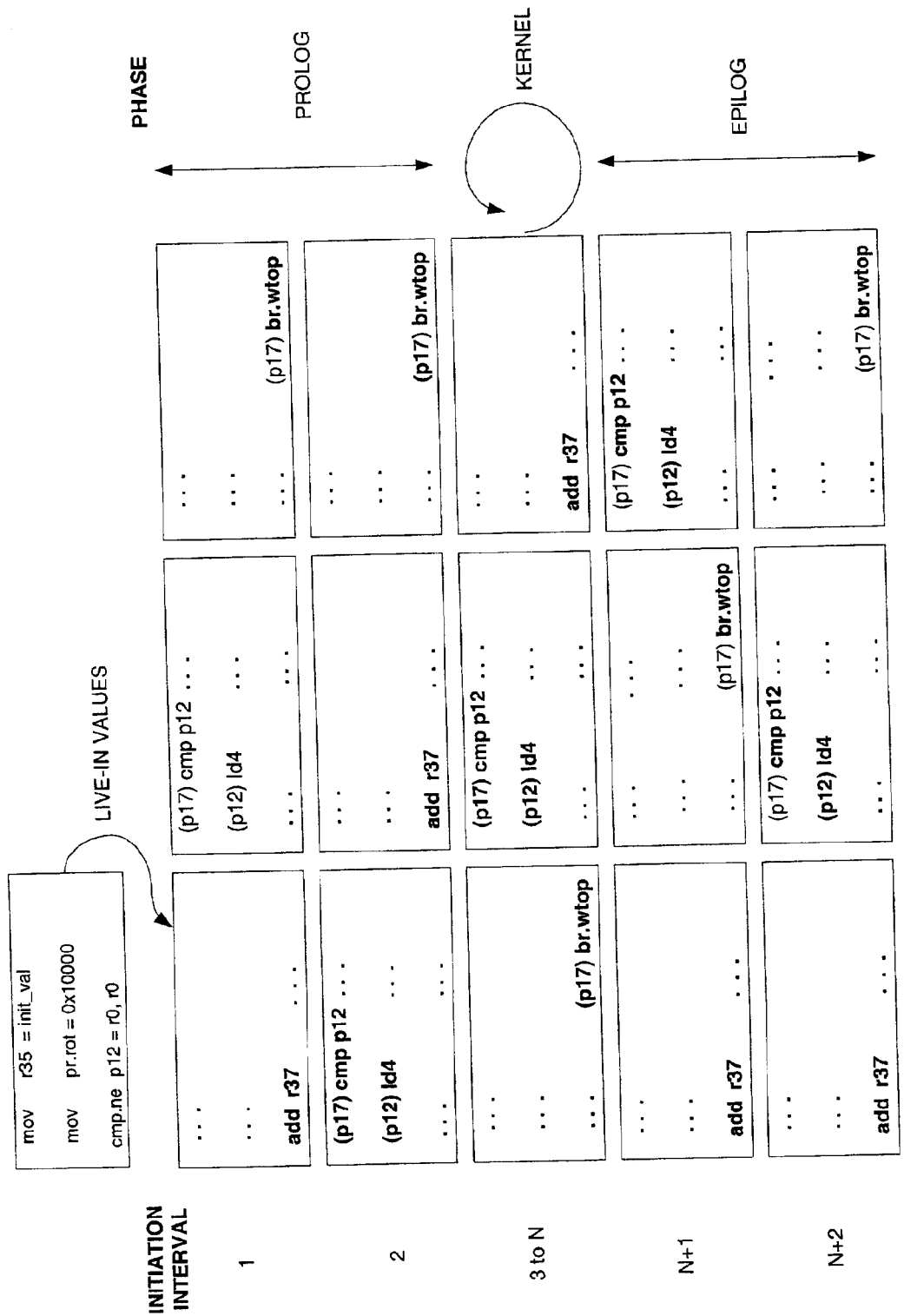
FIG. 6 is a schematic representation of a software-pipelined "while" loop that has been modified in accordance with the present invention.

FIG. 6 represents a software pipeline 600 generated by software pipelining code sequence (V) in accordance with the present invention. Bolded instructions are instructions that are executed for a given initiation interval. As indicated, the sticky predicate prevents the speculated instruction (ld4) from executing on the first II, and the speculated add instruction uses the live-in value provided by instruction (1). The activating instruction (cmp p12) is gated by p17, which is set true by the live-in value provided by instruction (2). Br.wtop executes on the first iteration because PR[qp]=0 but EC>0.

Figure 7:
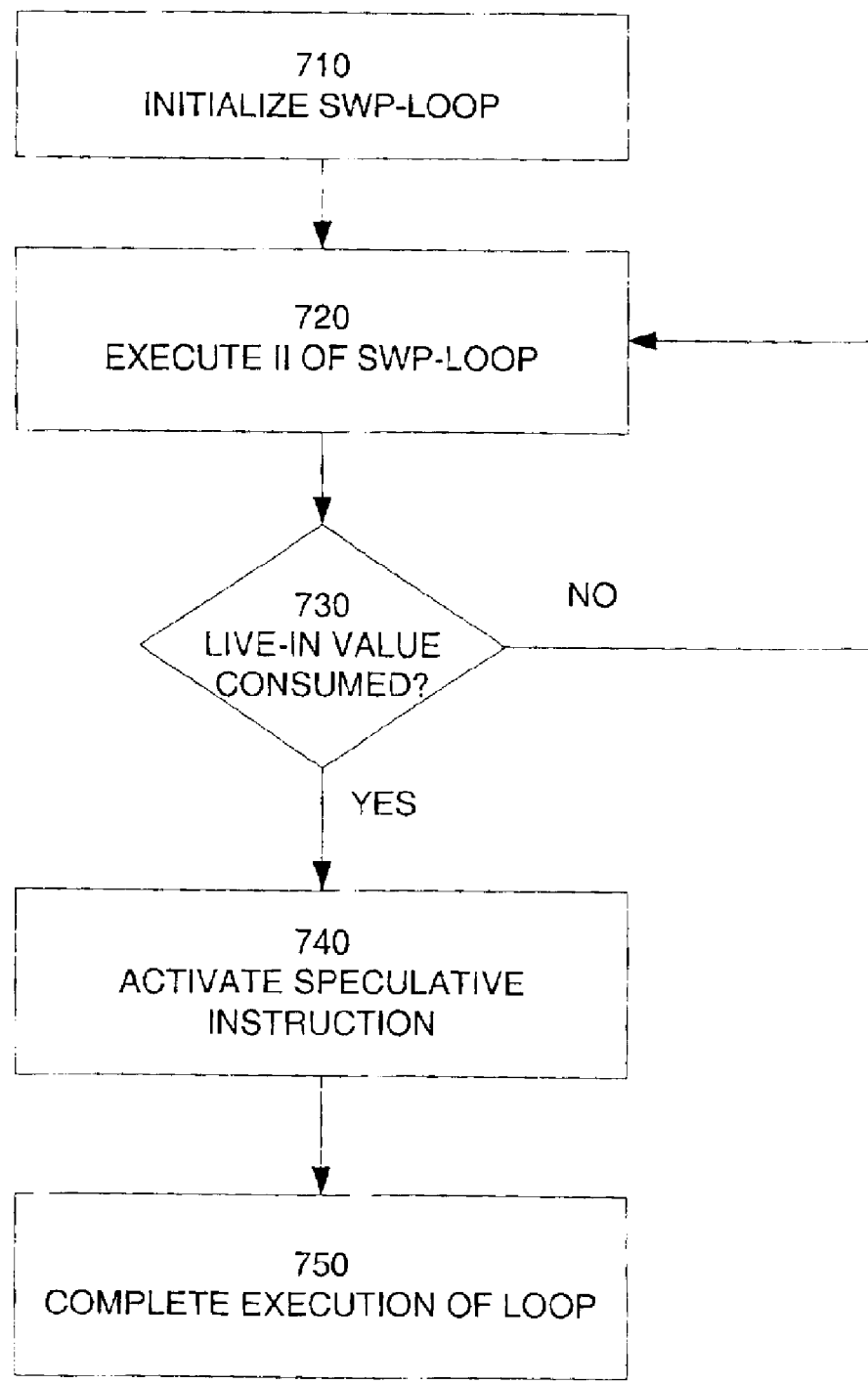
FIG. 7 is a flowchart representing one embodiment of a method for executing a software-pipelined "while" loop that has been modified in accordance with the present invention.

FIG. 7 is a flowchart illustrating a method for executing a software-pipelined loop that has been scheduled in accordance with the present invention. For purposes of illustration, it is assumed that the speculative instruction modifies a variable that is also provided as a live-in value to the loop. The SWP loop is initialized 710 by specifying values for an epilog counter (EC), rotating predicate registers, a sticky predicate and any other live-in values that may be used by the loop. The sticky predicate is initialized false to prevent the speculative instruction it guards from executing prematurely. An initiation interval of the loop is executed 720 and predicates are updated. If the live-in value is not consumed 730 by the initiation interval, a next initiation interval of the loop is executed 720 and the predicates are updated. If the live-in value is consumed 730, the sticky predicate is set to true, activating 740 the speculative instruction. The loop is then executed 750 to completion with the speculative instruction gated on for the remaining iterations.

Yet another embodiment of the invention may be employed when the speculated instruction is a compare instruction. This embodiment is illustrated by code sequence (VI), which is a modified version of code sequence (I).

```
             (1)         mov     pr.rot  = 0x10000    // initialize predicates
             (2)         mov     EC      = 2          // initialize EC
             (7)         mov     r39     = r0         // initialize register
       Loop:
(I)          (3)         . . .                        // stage A
             (4)         cmp.ne  p20 = r39, r0        // stage B
             (5)  (p21)  cmp.le  p17 = r35, r11       // stage C
                         . . .
             (6)  (p17)  br.wtop  Loop.
```

For the disclosed embodiment of the invention, r39 is a source register for the compare instruction that determines the value of p20. This source register is initialized so that p20 will evaluate false on the first II, when it is speculatively executed. As a result, p17 is not written by instruction (5) during the second II, and the live-in value (provided from p16 through register rotation) is preserved. The speculated compare (instruction (4)) is correctly executed in stage B, which in turn activates the control compare, instruction (5), for the third II.

More generally, if the speculated compare is scheduled in a stage N>1 and it clobbers a live-in value if executed prematurely, it can be prevented from setting the associated predicate true by proper initialization of the register on which it depends (source register). The register(s) to be initialized are chosen to provide the appropriate delay before activating the speculated compare. For example, if the speculated compare is to be activated in the fourth II, the predicate it writes should evaluate false in the first three IIs. This may be accomplished by initializing r37, r38, and r39 to zero. Rotation of the integer registers then ensures that cmp.ne p20 r39, r0 evaluates p20 false for the first three IIs.

Figure 8:
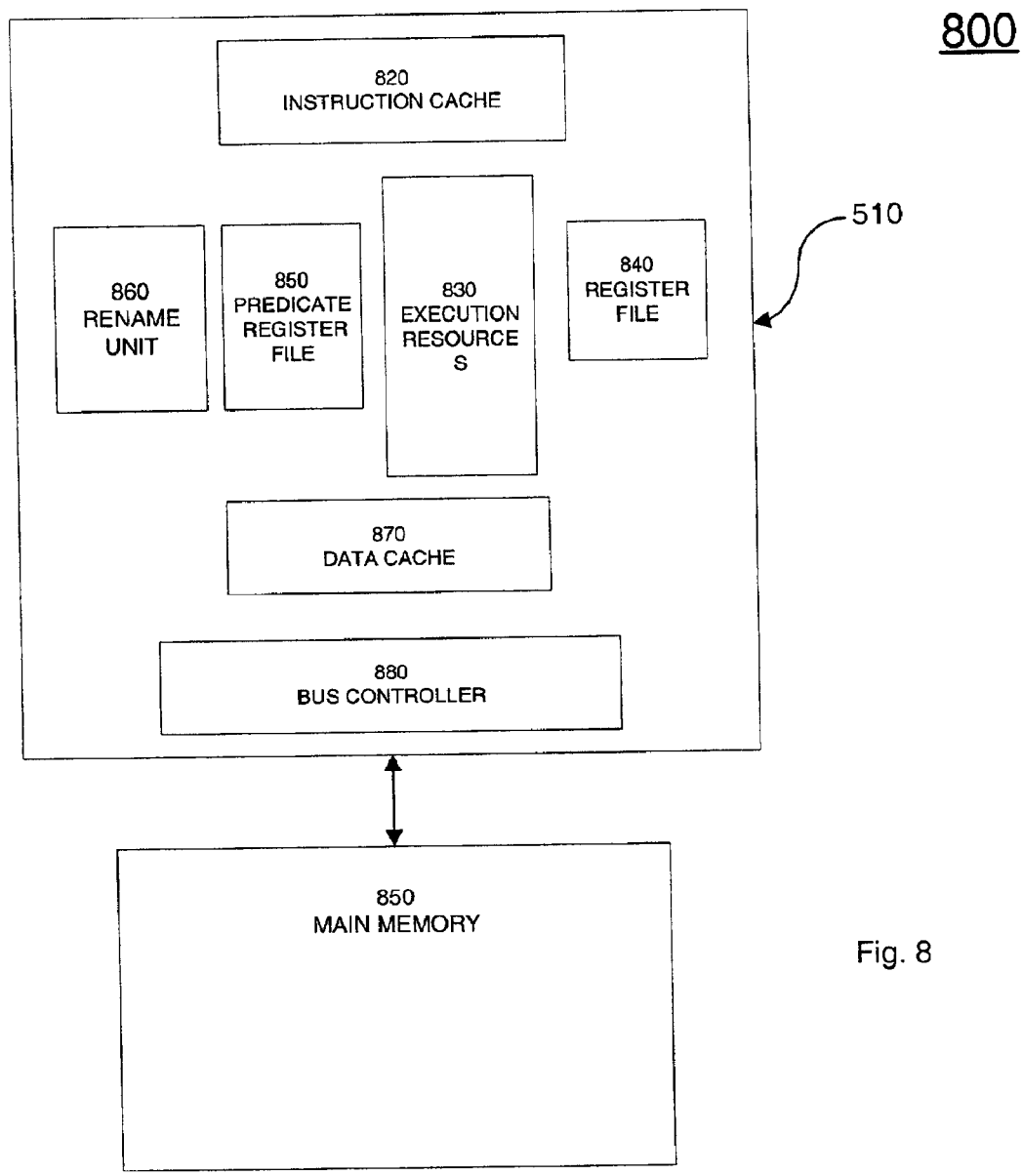
FIG. 8 is a block diagram of a computer system that is suitable for implementing embodiments of the present invention.

FIG. 8 is a block diagram of one embodiment of a computer system 800 that is suitable for software pipelining loops in accordance with the present invention. Computer system 800 may also execute programs that contain such software-pipelined loops. The disclosed embodiment of computer system 800 includes a processor 810 and a memory system 890. Processor 810 includes an instruction cache 820, execution resources 830, a data register file 840, a predicate register file 850, a rename unit 860, a data cache 870 and a bus controller 880. Processor 810 may include other functional units, such as a cache controller, exception unit, and the like, which are not shown in FIG. 8.

Predicate register file 850 stores predicate values, which may be used to activate or deactivate various instructions. One embodiment of predicate register file 850 includes a non-rotating segment (p0–p15) and a rotating segment (p16–p63). Predicate registers in the rotating segment may be rotated under control of rename unit to implement software-pipelined loops.

Memory system 890 may store instructions 894 and data 898 for controlling the operation of processor 810. For example, instructions 894 may represent a compiler program that is applied to a target program by processor 810 to modify loops in the target program to implement instruction speculation using sticky predicates, as described above. Instructions 894 may also store a program modified in accordance with the present invention to support instruction speculation using sticky predicates. When run on processor 894, the program executes the modified loops, including those segments that initialize a sticky predicate, detect consumption of a live-in value subject to corruption by a speculated instruction and reset the sticky predicate to activate the speculative instruction when appropriate.

The disclosed embodiments of the present invention are provided for purposes of illustration. Persons skilled in the art of programming and having the benefit of this disclosure will recognize variations on the disclosed embodiments that fall within the spirit of the present invention. The scope of the present invention should be limited only by the appended claims.

What is claimed is:

1. A method comprising:
   initializing to false a predicate that guards a speculative instruction in a software-pipelined loop;
   executing at least one iteration of the software-pipelined loop, including an instruction that sets the predicate to true if an associated live-in value is consumed; and
   executing the speculative instruction in subsequent iterations of the software-pipelined loop.

2. The method of claim 1, wherein the instruction that sets the predicate true is gated by a stage predicate of the software-pipelined loop.

3. The method of claim 2, wherein executing—at least one iteration of the software-pipelined loop comprises executing the predicate setting instruction when the stage predicate is true.

4. The method of claim 2, wherein the stage predicate is selected to delay execution of the speculative instruction until the live-in value has been consumed.

5. The method of claim 1, wherein initializing to false a predicate comprises initializing to false a predicate other than a stage predicate.

6. A method comprising:
   initializing a software-pipelined loop to deactivate a speculative instruction;
   executing at least one initiation interval (II) of the software-pipelined loop;
   activating the speculative instruction; and
   executing subsequent IIs of the software-pipelined loop.

7. The method of claim 6, wherein initializing the software-pipelined loop comprises initializing as false a predicate that guards the speculative instruction.

8. The method of claim 7, wherein executing at least one II of the software-pipelined loop comprises executing an instruction that determines a value for the predicate guarding the speculative instruction.

9. The method of claim 8, wherein activating the speculative instruction comprises executing the speculative instruction if the predicate is true.

10. The method of claim 6, wherein the speculative instruction is a compare instruction and initializing the software pipeline to deactivate the speculative instruction comprises initializing a rotating source register for the compare to a value for which a predicate determined by the compare instruction is false.

11. The method of claim 10, wherein activating the speculative instruction comprises rotating a value into the source register used by the compare to determine if the predicate is true.

12. The method of claim 7, wherein executing at least one II of the software-pipelined loop comprises executing an instruction that activates the speculative instruction.

13. A method for software pipelining a "while" loop comprising:
   identifying a speculative instruction in the loop;
   guarding the speculative instruction with a sticky predicate;
   initializing the sticky predicate to false; and
   inserting an instruction to set the sticky predicate true at a specified initiation interval of the loop.

14. The method of claim 13, wherein inserting an instruction comprises an instruction to set the sticky predicate true when a live-in value targeted by the speculative instruction is consumed.

15. The method of claim 10, wherein the inserted instruction is a compare instruction that is gated by a stage predicate.

16. The method of claim 15, wherein the inserted instruction evaluates the sticky predicate as true when it is gated on by the stage predicate.

17. The method of claim 16, wherein the stage predicate is selected to activate the inserted instruction once the live-in value is consumed.

18. An apparatus comprising a machine readable medium on which are stored instructions that may be executed by a processor to implement a method comprising:

executing a stage of a software-pipelined loop that includes a speculative instruction, the speculative instruction being gated off by a sticky predicate;

executing an instruction that sets the sticky predicate; and executing the stage of the software-pipelined loop, including executing the speculative instruction.

19. The machine-readable medium of claim 18, wherein the method further comprises initializing the sticky predicate to false to gate the speculative instruction off prior to executing the software-pipelined loop.

20. The machine-readable medium of claim 18, wherein executing an instruction that sets the sticky predicate comprises:

rotating a new value into a stage predicate that guards the sticky predicate setting instruction; and executing the sticky predicate setting instruction when the stage predicate is true.

21. A computer system comprising:

a processor to execute instructions; and a memory to store instructions which may be executed by the processor to implement a method comprising:

executing an initiation interval of a software-pipelined loop that includes a speculative instruction, the speculative instruction being gated off by a sticky predicate;

executing an instruction that sets the sticky predicate; and executing a subsequent initiation interval of the software-pipelined loop, including executing the speculative instruction.

22. The computer system of claim 21, wherein the method further comprises initializing the sticky predicate to false to gate the speculative instruction off prior to executing the software-pipelined loop.

23. The computer system of claim 22, wherein executing an instruction that sets the sticky predicate comprises:

rotating a new value into a stage predicate that guards the sticky predicate setting instruction; and executing the sticky predicate setting instruction when the stage predicate is true.

24. A computer system comprising:

a processor to execute instructions; and a memory to store instructions which may be executed by the processor to:

initialize a software-pipelined loop to deactivate a speculative instruction;

execute at least one initiation interval (II) of the software-pipelined loop;

activate the speculative instruction; and execute subsequent IIs of the software-pipelined loop.

25. The computer system of claim 24, wherein the processor initializes the software-pipelined loop by at least initializing as false a predicate that guards the speculative instruction.

26. The computer system of claim 25, wherein the processor executes at least one II of the software-pipelined loop by at least executing an instruction that determines a value for the predicate guarding the speculative instruction.

* * * * *